United States Patent [19]

Godard

[11] 4,309,770

[45] Jan. 5, 1982

[54] METHOD AND DEVICE FOR TRAINING AN ADAPTIVE EQUALIZER BY MEANS OF AN UNKNOWN DATA SIGNAL IN A TRANSMISSION SYSTEM USING DOUBLE SIDEBAND-QUADRATURE CARRIER MODULATION

[75] Inventor: Dominique N. Godard, Le Rouret, France

[73] Assignee: International Business Machines Corp., Armonk, N.Y.

[21] Appl. No.: 136,195

[22] Filed: Apr. 1, 1980

[30] Foreign Application Priority Data

Apr. 17, 1979 [FR] France .................... 79 10422

[51] Int. Cl.³ .............................. H03H 7/40
[52] U.S. Cl. ............................. 375/14; 333/18
[58] Field of Search ............. 375/13, 15, 43; 333/18; 364/724

[56] References Cited

U.S. PATENT DOCUMENTS

| | | | |
|---|---|---|---|
| 3,978,407 | 8/1976 | Forney, Jr. | 375/13 |
| 4,047,013 | 9/1977 | Milewski | 364/724 |
| 4,089,061 | 5/1978 | Milewski | 364/724 |
| 4,227,160 | 10/1980 | Tamori et al. | 375/13 |

Primary Examiner—Benedict V. Safourek
Attorney, Agent, or Firm—John B. Frisone

[57] ABSTRACT

This invention relates to automatic adaptive equalizers used in those data transmission systems which rely upon a double sideband-quadrature carrier (DSB-QC) modulation technique. The term DSB-QC modulation is used here in a broad sense and includes all systems wherein the transmitted signal can be represented by superimposing two amplitude modulated quadrature carriers. Thus, the term DSB-QC includes, in particular, phase-shift keying, amplitude phase-shift keying and quadrature amplitude modulation. More particularly, this invention relates to a method and a device for training an adaptive equalizer by means of an unknown data signal sent to the receiver, and is especially useful in a data transmission system configured as a multipoint network.

14 Claims, 8 Drawing Figures

METHOD AND DEVICE FOR TRAINING AN ADAPTIVE EQUALIZER BY MEANS OF AN UNKNOWN DATA SIGNAL IN A TRANSMISSION SYSTEM USING DOUBLE SIDEBAND-QUADRATURE CARRIER MODULATION

BACKGROUND ART

In those data transmission systems which rely upon a DSB-QC modulation technique, the sequence of bits to be transmitted is first divided into groups of Q bits and each of these groups is made to correspond to one of $2^Q$ complex numbers, or complex symbols. The set of $2^Q$ symbols is usually represented on a complex plane by mapping thereon the points having these symbols as coordinates. In general, these points are collectively referred to as the signal constellation. The symbols are then transmitted one at a time at instants which have a regular T-second spacing and are called signaling instants. Each symbol is transmitted by causing an amplitude value of each of two quadrature carriers to correspond, respectively, to its real and imaginary parts. These two carriers are then combined and applied to the input of the transmission channel.

The function of the transmission channel is to provide at its output, which is connected to a data receiver, a signal relatively similar to the input signal applied thereto. Mainly due to cost considerations, telephone lines are frequently used as transmission channels. However, such lines, while satisfactory for voice transmission purposes, become inadequate when used to transmit digital data at speeds equal to or higher than 4800 bits per second (bps) with a very low probability of error. Telephone lines cause impairments which affect the quality of the signals being transmitted and make it difficult to correctly detect the transmitted data. These impairments mainly include amplitude and phase distortions that create an interaction between successive signals. This interaction is known as intersymbol interference. In high-speed data transmission systems, the receiver is generally provided with an automatic adaptive equalizer to minimize the effects of intersymbol interference prior to the data being detected.

The type of adaptive equalizer that is the mpst widely used in those data transmission systems which rely upon a DSB-QC modulation technique is the complex transversal equalizer an exemplary embodiment of which is described in French Pat. No. 73-26404 (publication No. 2,237,379). In such an equalizer, each of the in-phase and quadrature components of the received signal is applied to the input of a pair of transversal filters whose outputs are then combined to generate the in-phase and quadrature components of the equalized signal. The tap gains of these filters, which constitute the tap gains of the equalizer, are automatically adjusted to meet a given performance criterion. Before transmitting any data, it is necessary that the values of the tap gains be as close as possible to optimum values. To this end, provision is made for a training period during which, before sending any data, a known training sequence is transmitted and is then analyzed by the receiver which derives therefrom an initial adjustment of the tap gains of the equalizer to values that are as close as possible to the optimum values. The tap gains are then continually adjusted during transmission of the data.

In those data transmission systems which are configured as a multipoint network, several data terminals exchange data over a common transmission line. Each terminal is connected to the common line through a modem that includes a data transmitter and a data receiver. These terminals have varying degrees of intelligence, and in general one of them, which is often a computer, controls the entire network, with the transmission of data taking place between this computer and the other data terminals. Usually, the modem associated with the computer is referred to as the master modem while the other modems are called the slave modems. In general, a network training procedure is carried out once a day before the first transmission of data takes place. During this procedure, the master modem transmits synchronizing signals over the common transmission line to condition the receivers of the slave modems to receive the data to be subsequently transmitted. These synchroning signals include a known training sequence that serves to train the equalizers of the slave modems. However, it may prove necessary in some cases to train the equalizer of a slave modem after completion of the network training procedures. For example, a slave modem may happen to be in a power off condition at the time the network training procedure is carried out and as a result fail to receive the training sequence, or it may be conditioned through said procedure, but subsequently lose equalization because of some degradation of the transmission line characteristics.

Several methods of training the equalizer of a receiver in such cases have been proposed in the prior art.

In one of these methods, the master modem periodically transmits a training sequence to permit training the equalizers of all slave modems. In another known method, any slave modem which has lost equalization alerts the master modem which responds by transmitting a training sequence intended for the equalizer of that particular slave modem.

In both of these prior art methods, the receiver of the slave modem knows the transmitted training sequence and can fairly easily derive an initial adjustment of the equalizer from the received training sequence. However, in both methods, the operation of the entire network is adversely affected since no data transmission can take place while the training sequence is being transmitted.

In a third method proposed in the prior art, means are provided in each slave modem for storing several sets of equalizer tap gain values which are successively tested whenever a loss of equalization occurs. Obviously, a limited number of such sets can be used, and it may not be possible to retrieve the equalization in the event of significant distortions being introduced by the transmission line.

French patent application No. 78-18478 filed by the present applicant June 13, 1978, discloses a method of training the equalizer of a receiver in a transmission system that relies upon a quadrature amplitude modulation technique; this is done by means of an unknown data signal, which makes it possible, in particular, to train the equalizer in the cases described above. In accordance with the method described in said patent application, in a data receiver wherein, under normal operating conditions, the data are detected with respect to a first signal constellation, which is the one used by the transmitter in said system, training of the equalizer is achieved by detecting the data with respect to a second signal constellation that comprises fewer points than the first one and by adjusting the tap gains of the equalizer by means of an error signal produced as a result of the detection operation performed with respect to the second signal constellation. This solution yields very good results, but requires that the signal constellation used by the transmitter be known to the receiver. In any data transmission system, the data rate can vary from time to time as a result, for example, of impairments caused by the transmission channel. In systems using DSB-QC modulation, the data rate is generally varied by varying the signal constellation being used rather than the signaling rate. In that case, a slave modem which has lost equalization and must use any signals present on the common transmission line for training purposes does not known exactly the signal constellation being used by the master modem.

DISCLOSURE OF INVENTION

Accordingly, it is the principal object of this invention to provide a method and a device for training the equalizer of a DSB-QC receiver that require no transmission of a known training sequence and no knowledge of the signal constellation used by the transmitter to transmit data.

Generally, the invention proposes a method and a device for training the equalizer of a receiver in a transmission system using DSB-QC modulation, which involve the use of an unknown data signal and require no knowledge of the signal constellation used by the transmitter. In accordance with the method of the present invention, the equalizer is trained by adjusting its tap gains so as to minimize a quantity $D^{(p)}$ referred to herein as "dispersion of order p" and defined as $$D^{(p)} = E(|z_n|^p - R)^2$$

where
p is a positive integer,
E is the mathematical expectation,
$Z_n$ is the equalized signal at the signaling instant nT, and
R is a positive real constant.

To minimize the dispersion $D^{(p)}$, an error signal derived from the equalized signal is generated, with the error signal $e_n$ at the signaling instant nT being defined as $$e_n = z_n |z_n|^{p-2}(|z_n|^p - R)$$

and the tap gains of the equalizer are adjusted in such a way that the correlation product $$EY_n^* e_n$$

where
$Y_n$ is the vector of the signal stored in the equalizer, and
* denotes the conjugate complex quantity
will tend to approach zero.

In accordance with a preferred embodiment of the invention, the tap gains of the equalizer are adjusted so as to minimize the dispersion of order 1, $D^{(1)}$, which is written as $$D^{(1)} = E(|z_n| - R)^2$$

The error signal $e_n$ is then defined as $$e_n = z_n - R \exp j\omega_n$$

where $\omega_n$ is the phase of the equalized signal $z_n$.

The foregoing and other objects, features and advantages of the invention will be apparent from the following more particular description of a preferred embodiment of the invention, as illustrated in the accompanying drawings.

BEST MODE FOR CARRYING OUT THE INVENTION

Figure 1:
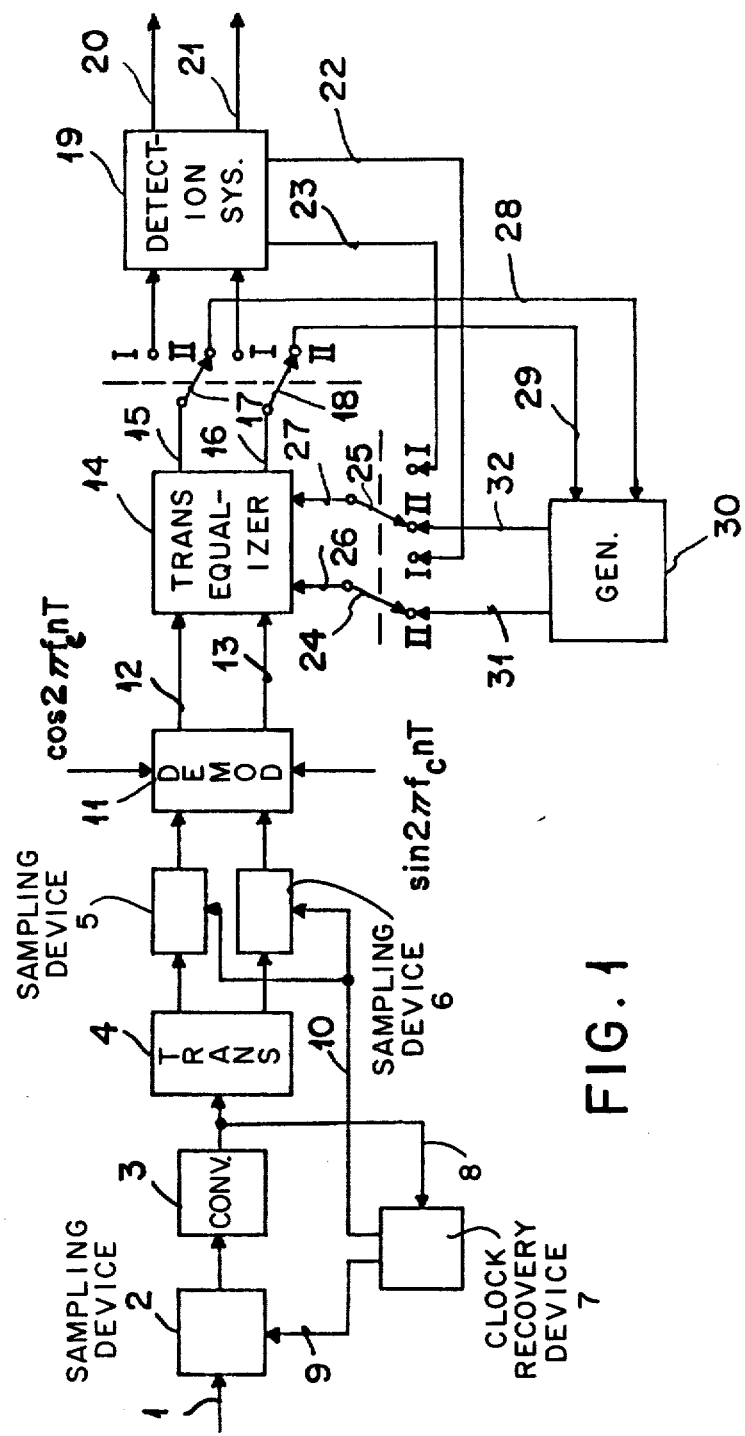
FIG. 1 is a block diagram of a DSB-QC receiver incorporating the invention.

To illustrate the context within which the invention finds application, a typical block diagram of a DSB-QC, 9600 bps receiver in accordance with CCITT Recommendation V29 and incorporating the invention is shown in FIG. 1. The signal received from the transmission channel and the energy of which has been normalized by an automatic gain control circuit (not shown), is applied via a line 1, after being passed through a bandpass filter (not shown) which rejects the out-of-band noise, to a sampling device 2 in which it is sampled at the rate $1/\tau$. The selected rate $1/\tau$ is equal to a multiple m/T of the signaling rate 1/T so as to provide a sufficient number of samples at the output of the device 2 to enable the received signal to be properly defined. The value of the amplitude of these samples is converted to digital form in an analog-to-digital converter 3 and inputted to a digital Hilbert transformer 4.

A Hilbert transformer is a device which has one input and two outputs and provides at its outputs the inphase and quadrature components, respectively, of an input signal. An exemplary digital embodiment of such a device is described in an article entitled "Theory and Implementation of the Discrete Hilbert Transform", by L. R. Robiner and C. M. Rader, in *Digital Signal Processing*, IEEE Press, 1972.

The in-phase and quadrature components of the input signal applied to the Hilbert transformer 4 are respectively re-sampled at the signaling rate 1/T by two sampling devices 5 and 6. A clock recovery device 7 has its input connected via a line 8 to the output of the analog-to-digital converter 3 and controls the sampling device 2 via a line 9, the sampling devices 5 and 6 via a line 10, and all other components of the receiver via lines not shown. An exemplary embodiment of such a clock recovery device is described in French Pat. No. 75-14020 filed by the present applicant Apr. 25, 1975 (publication No. 2,309,089). The in-phase and quadrature components, respectively provided at the outputs of the sampling devices 5 and 6, of the received signal are applied to the inputs of a complex demodulator 11. The demodulator 11 receives from a local source (not shown) an in-phase carrier of the form $\cos 2\pi f_c nT$ and a quadrature carrier of the form $\sin 2\pi f_c nT$, where $f_c$ is the carrier frequency and n is a positive integer the value of which ranges from zero to infinity. If the signal received at the signaling instant nT is designated $r_n$, the in-phase and quadrature components thereof respectively available at the outputs of the sampling devices 5 and 6 may be expressed as $r_{i,n}$ and $r_{q,n}$, respectively. The demodulator 11 provides on the lines 12 and 13 the in-phase and quadrature components $y_{i,n}$ and $y_{q,n}$, respectively, of the demodulated signal $y_n$, in accordance with the well-known relations:

$$y_{i,n} = r_{i,n} \cos \omega_c t + r_{q,n} \sin \omega_c t$$
$$y_{q,n} = -r_{i,n} \sin \omega_c t + r_{q,n} \cos \omega_c t$$

The in-phase and quadrature components available on the lines 12 and 13 are applied to the inputs of an adaptive complex transversal equalizer 14, an exemplary embodiment of which is described in French Pat. No. 73-26404 filed by the present applicant July 12, 1973 (publication No. 2,237,379).

The in-phase and quadrature components of the equalized signal are respectively applied via lines 15 and 16 to the common input of a couple of two-position switches 17 and 18. The input positions I of these switches are connected to the inputs of a data detection system 19 which provides on its output lines 20 and 21 the in-phase and quadrature components, respectively, of the detected data symbols. The system 19 also supplies on its output lines 22 and 23 the in-phase and quadrature components of an error signal representative of the difference between the components of the equalized signal and those of the detected data symbol corresponding thereto. An exemplary embodiment of a data detection system is described in French Pat. No. 74-43560 filed by the present applicant Dec. 27, 1974 (publication No. 2,296,322). The lines 22 and 23 are respectively connected to the input positions I of a couple of two-position switches 24 and 25 whose outputs are respectively connected to the equalizer 14 via lines 26 and 27.

The input positions II of the switches 17 and 18 are respectively connected via lines 28 and 29 to the inputs of an error signal generator 30. This generator is in accordance with the invention and will be described in detail with reference to FIGS. 2 and 3. The two outputs of this generator are respectively connected via lines 31 and 32 to the input positions II of the switches 24 and 25.

In the data mode of operation the switches 17, 18, 24 and 25 are all set to the input position I. The received signal whose in-phase and quadrature components are respectively available at the outputs of the sampling devices 5 and 6 is demodulated in the demodulator 11 and equalized in the equalizer 14, and its in-phase and quadrature components are then applied to the data detection system 19 through the switches 17 and 18, both of which are set to position I. At each signaling instant, the detection system 19 provides the components of the detected symbol on its output lines 20 and 21 and the components of the error signal on its output lines 22 and 23. The latter components are applied through the switches 24 and 25, both of which are set to position I, to the equalizer 14, which derives therefrom control signals serving to adjust its tap gains.

In the data mode of operation, the tap gains of the equalizer are properly adjusted during the training period to values that are as close as possible to the optimum values, very few detection errors are made by the data detection system 19, and the error signal provided by that system assures the convergence, that is, the correct operation, of the equalizer.

If the tap gains of the equalizer have not been properly adjusted prior to the transmission of data, either because the receiver failed to make use of the network training period or because equalization was lost, as explained earlier, then a large number of detection errors will occur and the error signal supplied by the data detection system 19 will no longer assure the convergence of the equalizer. It will then become necessary to train the qualizer.

In accordance with the method of the present invention the equalizer is trained by adjusting its tap gains by means of control signal derived from the error signal supplied by the error signal generator of the invention, rather than from the error signal provided by the data detection system. As shown in FIG. 1, the switches 17, 18, 24 and 25 are all set to the input position II in the training mode of operation. The in-phase and quadrature components of the equalized signal are applied to the error signal generator 30 through the switch 17 and the line 28, and through the switch 18 and the line 29, respectively. The generator 30 provides an error signal whose in-phase and quadrature components are available on the lines 31 and 32 and respectively applied through the switches 24 and 25, both of which are set to the input position II, to the equalizer 14, which derives therefrom control signals serving to adjust its tap gains.

In the receiver shown in FIG. 1, the received signal is demodulated before it is applied to the equalizer. Those skilled in the art will readily understand that the invention is equally applicable where the input signal received by the equalizer is not demodulated.

Before proceeding to a detailed description of the error signal generator 30, a discussion of the method of the invention will be presented.

Tap gains of the equalizers are generally adjusted so as to minimize the average quadratic error designated here $\epsilon^2$, which may be conventionally expressed as $$\epsilon^2 = E|z_n - a_n|^2 \quad (1)$$

where

E is the mathematical expectation,

| | denotes the modulus, $z_n$ is the output signal from the equalizer at the signaling instant nT, and $a_n$ is the data symbol transmitted at the signaling instant nT.

The more widely used method of adjusting the tap gains of the equalizer to minimize the average quadratic error is the so-called gradient method. This is an iterative method conventionally defined as $$C^{n+1} = C^n - \lambda y_n{}^*(z_n - a_n) \quad (2)$$

where $C^{n+1}$ is the vector of the tap gain values at the $(n+1)^{th}$ iteration, which generally coincides with the $(n+1)^{th}$ signaling instant, $C^n$ is the vector of the tap gain values at the $n^{th}$ iteration, which generally coincides with the $n^{th}$ signaling instant, $\lambda$ is a positive constant, $y_n$ is the vector of the input signals stored in the equalizer at the signaling instant nT, and

* denotes the conjugate complex quantity.

Note that relations (1) and (2) are a function of the transmitted symbol $a_n$. However, the receiver is not provided with this symbol but with an estimated value thereof, $\tilde{a}_n$, by the data detection system. The relation actually used by the receiver to adjust the tap gains of the equalizer is the following one, which is directly derived from relation (2):

$$C^{n+1} = C^n - \lambda y_n^*(z_n - \tilde{a}_n) \quad (3)$$

In the data mode of operation, the probability of the estimated value $\tilde{a}_n$ being equal to $a_n$ is very high, so that relation (3) is identical to relation (2) and permits adjusting the tap gains. If training is required by the equalizer, this means that the receiver is not working properly and, as a result, the data detection system makes many errors and $\tilde{a}_n$ frequently differs from $a_n$. In that case, relation (3) is no longer identical to relation (2) and no longer allows the tap gains to be correctly adjusted.

In accordance with the invention, the tap gains of the equalizer are adjusted in such a way as to minimize the quantity $D^{(p)}$ referred to herein as "dispersion of order p" and defined as $$D^{(p)} = E(|z_n|^p - R)^2 \quad (4)$$

where
p is a positive integer, and
R is a positive real constant, the selection of whose value will be discussed later.

To minize the dispersion of order p, the tap gains are adjusted by means of the iterative method defined below:

$$C^{l+1} = C^l - \beta \left[ \frac{dD^{(p)}}{dC} \right] C = C^l \quad (5)$$

where
$\beta$ is a positive constant,
$dD^{(p)}/dC$ is the derivative of the dispersion with respect to C, and
l is a positive integer that indicates the number of the iteration involved.

Using the complex vectorial notation, the signal $z_n$ may be written as $$z_n = y_n'C \quad (6)$$

where $y_n'$ is the transposed vector $y_n$.

The derivative of the dispersion of order p is then expressed as $$dD^{(p)}/dC = 2pEy_n^* z_n |z_n|^{p-2} (|z_n|^p - R) \quad (7)$$

Relation (5) is then written $$C^{l+1} = C^l - \beta 2pEy_n^* z_n |z_n|^{p-2}(|z_n|^p - R) \quad (8)$$

Relation (8) may be written as $$C^{l+1} = C^l - \mu E y_n^* e_n \quad (9)$$

where $$\mu = 2p\beta \quad (10)$$
$$e_n = z_n |z_n|^{p-2}(|z_n|^p - R)$$

Relation (8) shows that the tap gains are adjusted in such a way that the correlation product $E y_n^* e_n$, that is,
the average value of the product $y_n^* e_n$, will tend to approach zero.

Relation (9) can be approximated by means of the following stochastic iteration relation:

$$C^{n+1} = C^n - \mu y_n^* e_n \quad (9')$$

The previously defined quantity $e_n$ will be termed error signal hereafter. The adjustment method of the present invention will include two main steps constisting of:

determining the error signal $e_n$ as defined by relation (10), and then adjusting the tap gains in accordance with relation (9').

The particular case in which the tap gains are adjusted so as to minimize the dispersion of order 1 will now be described in greater detail.

According to relation (4), the dispersion of order 1 is written $$D^{(1)} = E(|z_n| - R)^2 \quad (11)$$

The error signal $e_n$ becomes $$e_n = z_n(1 - R/|z_n|) \quad (12)$$

Since $$z_n = |z_n| \exp j\omega_n \quad (13)$$

where $j = \sqrt{-1}$, and $\omega_n$ is the phase of $z_n$, relation (12) can be written $$e_n = z_n - R \exp j\omega_n \quad (14)$$

To adjust the tap gains of the equalizer so as to minimize dispersion $D^{(1)}$, the error signal $e_n$ as defined by relation (14) is first determined, and the tap gains are then adjusted in accordance with relation (9').

Figure 6:
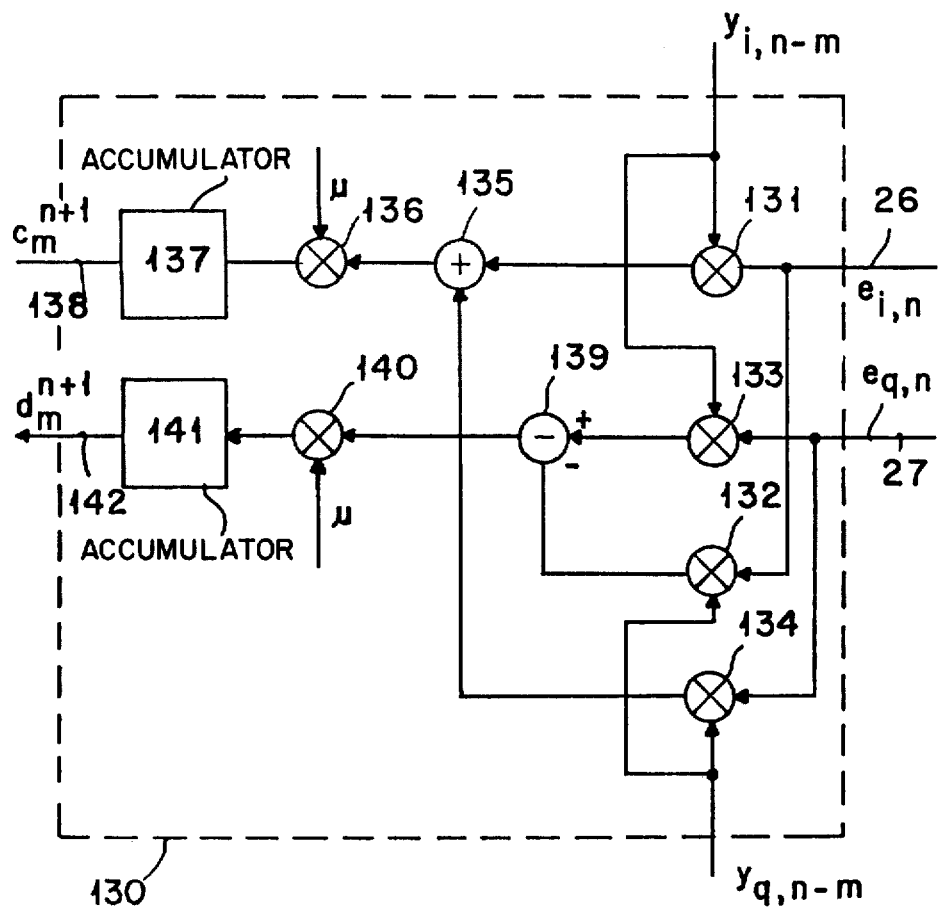
FIG. 6 is a schematic illustration of the tap gain adjustment device 130 of FIG. 5.

The error signal $e_n$ is determined by the error signal generator 30 whereas the adjustment of the tap gains in accordance with relation (9') is performed by the adjustment device associated with the equalizer and to be described later with reference to FIG. 6.

Figure 2:
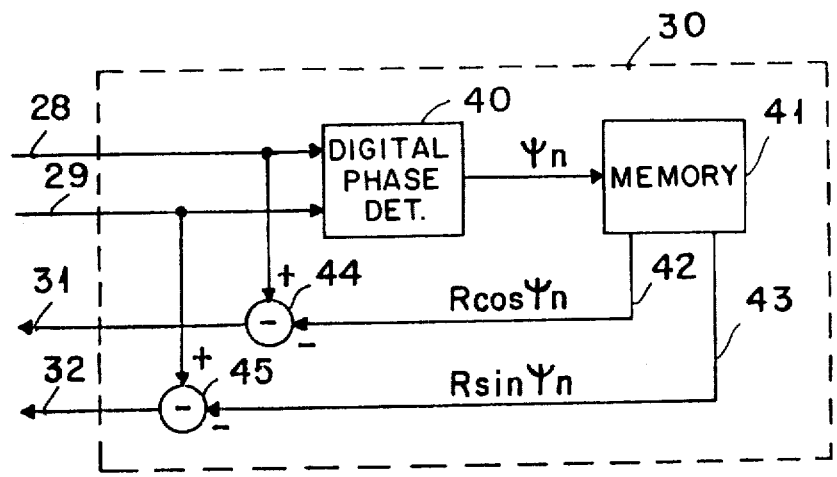
FIG. 2 illustrates a first embodiment of the error signal generator 30 of FIG. 1.

Referring now to FIG. 2, a first embodiment of an error signal generator 30 in accordance with the invention is shown. The in-phase and quadrature components of the equalized signal $z_n$, designated here $z_{i,n}$ and $z_{q,n}$, respectively, are applied via lines 28 and 29 (FIG. 1) to the inputs of a digital phase detector 40. This device is known per se and receives as inputs the components of a signal and supplies the phase thereof. A detailed description of such a device is given, for example, in French Pat. No. 71-47850 (publication No. 2,164,544). The phase detector 40 supplies the phase value $\omega_n$ which is applied to a read-only memory 41. The memory 41 contains a table of sines and cosines and responds to the incoming value $\omega_n$ by supplying the values of R cos $\omega_n$ and R sin $\omega_n$ on lines 42 and 43, respectively. Such a memory is commonly used in this manner and it is not believed necessary to provide further details. The quantities R cos $\omega_n$ and R sin $\omega_n$ are respectively fed to the (−) inputs of two binary subtractors 44 and 45 which have their (+) inputs respectively connected to the lines 28 and 29. The subtractor 44 supplies on the line 31 (FIG. 1) the quantity $z_{i,n} - R \cos \omega_n$ designated here $e_{i,n}$:

$$e_{i,n} = z_{i,n} - R \cos \omega_n \quad (15)$$

The subtractor 45 provides on the line 32 (FIG. 1) the quantity designated here $e_{q,n}$:

$$e_{q,n} = z_{q,n} - R \sin \omega_n \quad (16)$$

The quantities $e_{i,n}$ and $e_{q,n}$ are the in-phase and quadrature compoments of the error signal $e_n$ defined by relation (14).

Figure 3:
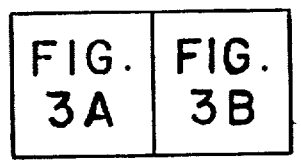
FIG. 3, consisting of FIGS. 3A and 3B, shows a second embodiment of the error signal generator 30 of FIG. 1.
Figure 3A:
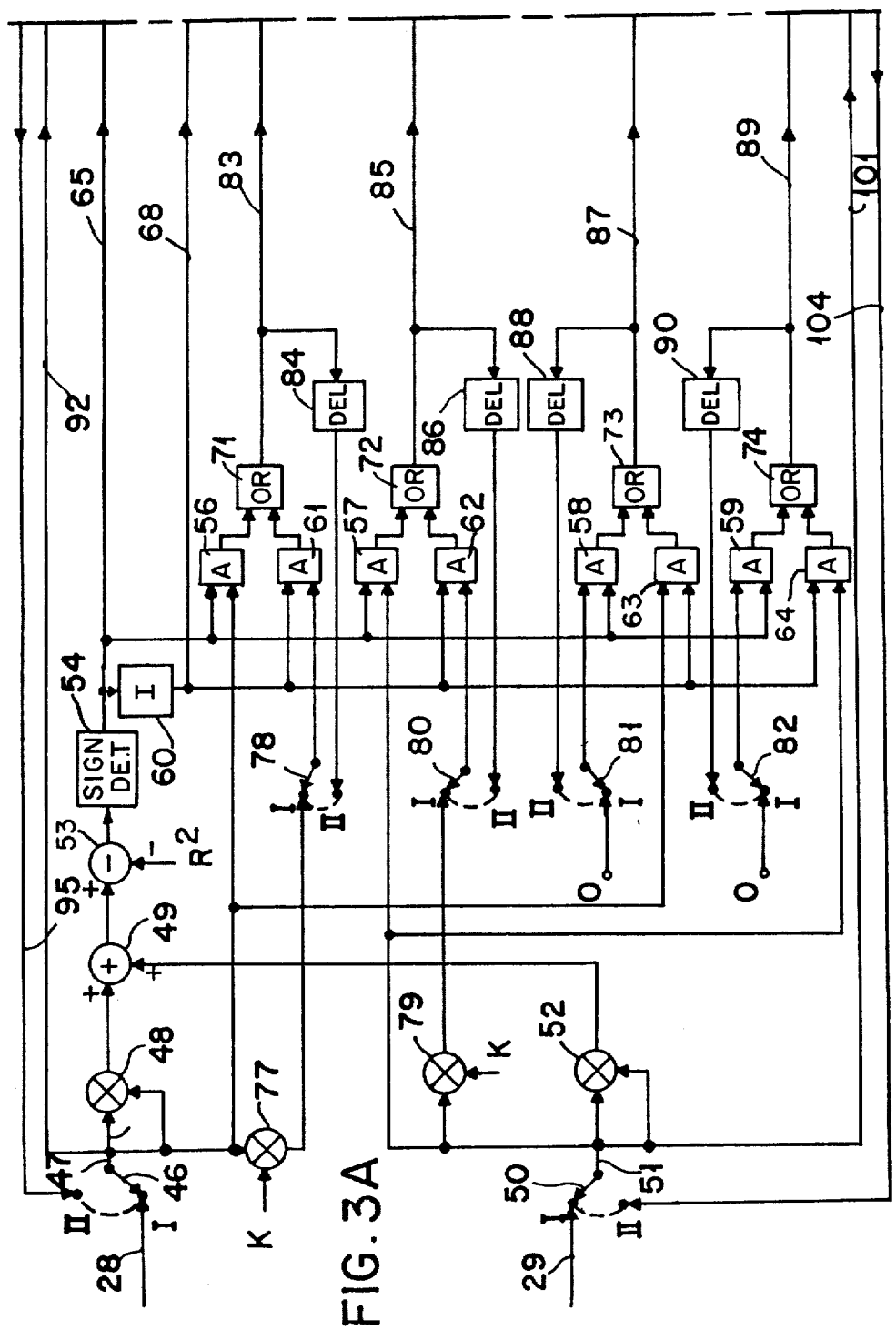
Figure 3B:
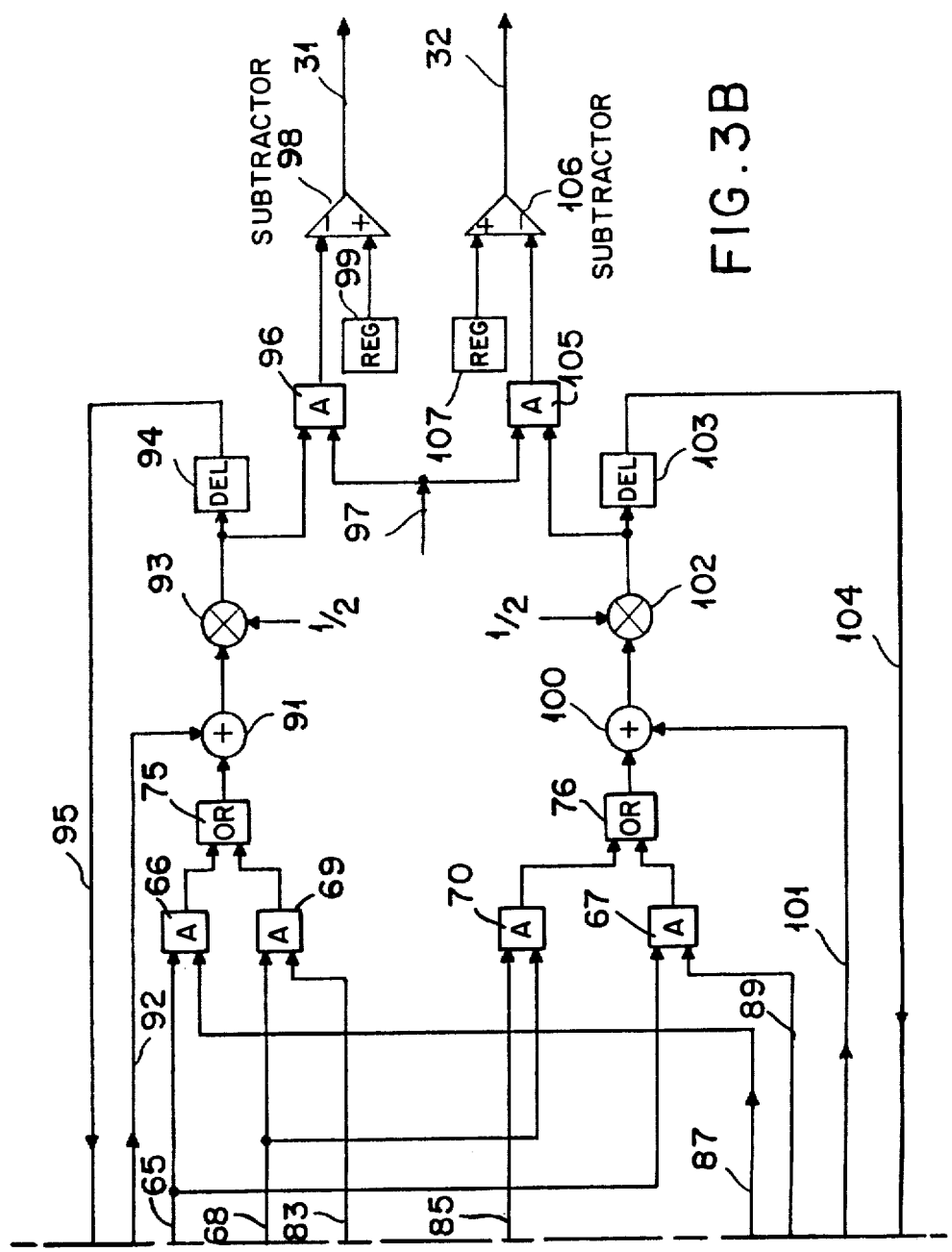

FIG. 3, consisting of FIGS. 3A and 3B, illustrates a second embodiment of the error signal generator 30 wherein the error signal is obtained by dichotomy.

Figure 4:
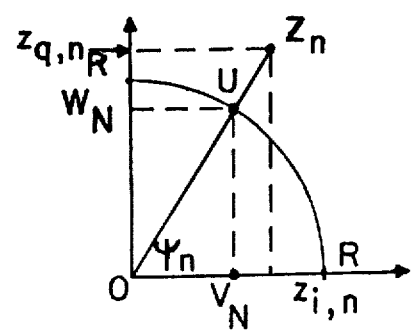
FIG. 4 is a diagram used to explain the operating principles of the error signal generator of FIG. 3.

Before describing the device of FIG. 3, the principles of operation thereof will be discussed with reference to the diagram of FIG. 4. This diagram includes a point $Z_n$, which is representative of the equalized signal $z_n$ and is defined by its Cartesian coordinates $z_{i,n}$ and $z_{q,n}$, and a circle of radius R (for simplicity, only one quadrant of this circle has been shown). Point U, whose Cartesian coordinates are $V_N$ and $W_N$, is the intersection of the vector $\overrightarrow{OZ_n}$ and the circle of radius R. It will be seen that the vector $\overrightarrow{UZ_n}$ is representative of the error signal $e_n$ defined by relation (14). We have $$\begin{aligned}e_{i,n} &= z_{i,n} - V_N \\ e_{q,n} &= z_{q,n} - W_N\end{aligned} \quad (17)$$

The coordinates of point U are determined by dichotomy as follows: Every dichotomy begins with an initialization step followed by several iterations.

INITIALIZATION

One determines two points having the same phase as $z_n$; one of these, whose coordinates are $V_{inf}(1)$ and $W_{inf}(1)$, is located within the circle while the other point, whose coordinates are $V_{sup}(1)$ and $W_{sup}(1)$, is located outside the circle.

To this end, one calculates the quantity $\Delta_o$ which is representative of the distance between the point $z_n$ and the circle:

$$\Delta_o = z_{i,n}^2 + z_{q,n}^2 - R^2 \quad (18)$$

If $\Delta_o < 0$, one selects $$\begin{aligned}V_{inf}(1) &= z_{i,n} \\ W_{inf}(1) &= z_{q,n} \\ V_{sup}(1) &= K z_{i,n} \\ W_{sup}(1) &= K z_{q,n}\end{aligned} \quad (19)$$

where K is a scaling factor the selected value of which is equal, for example, to 16 in the case of the receiver shown in FIG. 1.

If $\Delta_o > 0$, one selects $$\begin{aligned}V_{inf}(1) &= 0 \\ W_{inf}(1) &= 0 \\ V_{sup}(1) &= z_{i,n} \\ W_{sup}(1) &= z_{q,n}\end{aligned} \quad (20)$$

The first iteration is then performed:
If $\Delta_o > 0$, $$\begin{aligned}V_1 &= (z_{1,n} + V_{inf}(1))/2 \\ W_1 &= (z_{q,n} + W_{inf}(1))/2\end{aligned} \quad (21)$$

If $\Delta_o > 0$, $$\begin{aligned}V_1 &= (z_{1,n} + V_{sup}(1))/2 \\ W_1 &= (z_{q,n} + W_{sup}(1))/2\end{aligned} \quad (22)$$

ITERATIONS

Assume that it is desired to change $(V_n, W_n)$ and $(V_{inf}(n), W_{inf}(n), V_{sup}(n)$ and $W_{sup}(n))$ to $(V_{n+1}, W_{n+1})$ and $(V_{inf}(n+1), W_{inf}(n+1), V_{sup}(n+1)$ and $W_{sup}(n+1))$.

One calculates $$\Delta_n = V_n^2 + W_n^2 - R^2 \quad (23)$$

If $\Delta_n > 0$, one selects $$\begin{aligned}V_{inf}(n+1) &= V_{inf}(n) \\ W_{inf}(n+1) &= W_{inf}(n) \\ V_{sup}(n+1) &= V_n \\ W_{sup}(n+1) &= W_n\end{aligned} \quad (24)$$

If $\Delta_n < 0$, one selects $$\begin{aligned}V_{inf}(n+1) &= V_n \\ W_{inf}(n+1) &= W_n \\ V_{sup}(n+1) &= V_{sup}(n) \\ W_{sup}(n+1) &= W_{sup}(n)\end{aligned} \quad (25)$$

and one performs the iteration: (if $\Delta_n > 0$)

$$\begin{aligned}V_{n+1} &= (V_n + V_{inf}(n+1))/2 \\ W_{n+1} &= (W_n + W_{inf}(n+1))/2\end{aligned} \quad (26)$$

or (if $\Delta_n < 0$)

$$\begin{aligned}V_{n+1} &= (V_n + V_{sup}(n+1))/2 \\ W_{n+1} &= (W_n + W_{sup}(n+1))/2\end{aligned} \quad (27)$$

After N iterations, one obtains the coordinates $V_N$ and $W_N$ of point U with a very good approximation. In practive, the dichotomy converges quite well after six or seven iterations.

Once the coordinates $V_N$ and $W_N$ have thus been determined, the components of the error signal are obtained in accordance with relation (17).

It will be noted that the rate at which the iterations are performed is solely dependent upon the speed of the various components involved.

Referring next to FIG. 3, the component $z_{i,n}$ available on the line 28 is applied to the input position 1 of a switch 46 whose output is fed via a line 47 to the two inputs of a multiplier 48 which has its output connected to one of the inputs of an adder 49. The component $z_{q,n}$ available on the line 29 is applied to the input position 1 of a switch 50 whose output is applied via the line 51 to the two inputs of a multiplier 52 which has its output connected to the other input of the adder 49.

The output from the adder 49 is applied to the (+) input of a subtractor 53 whose (−) input receives the quantity $R^2$. The output from the subtractor 53 is applied to a sign determining device 54 which has its output connected to an input of each of four AND gates 56, 57, 58 and 59, and, through an inverter 60, to an input of each of four AND gates 61, 62, 63 and 64. In addition, the output of the device 54 is connected via a line 65 to an input of each of two AND gates 66 and 67. The output of the inverter 60 is also connected via a line 68 to an input of each of two AND gates 69 and 70. The outputs from the AND gates 56 and 61 are applied to the inputs of an OR gate 71. The outputs from the AND gates 57 and 62 are applied to the inputs of an OR gate 72. The outputs from the AND gates 58 and 63 are applied to the inputs of an OR gate 73. The outputs from the AND gates 59 and 64 are applied to the inputs of an OR gate 74. The outputs from the AND gates 66 and 69 are applied to the inputs of an OR gate 75, and the outputs from the AND gates 67 and 70 are applied to the inputs of an OR gate 76. The line 47 is also connected to the other input of each of the AND gates 56 and 63, and to one of the inputs of a multiplier 77 the other input of which receives the quantity K. The output of the multiplier 77 is connected to the input position I of a switch 78 which has its output connected to the other input of the gate 61. The line 51 is connected to the other input of the AND gates 57 and 64, and to one of the inputs of a multiplier 79 the other input of which receives the quantity K. The output of the multiplier 79 is connected to the input position I of a switch 80 whose output is connected to the other input of the AND gate 62. The other input of the AND gate 58 is connected to the output of a switch 81 whose input position I receives the quantity O. The other input of the AND gate 59 is connected to the output of a switch 82 whose input position I receives the quantity O. The output of the OR gate 71 is connected via a line 83 to the other input of the AND gate 69 as well as to the input of a delay element 84 which has its output connected to the input position II of the switch 78. The output of the OR gate 72 is connected via a line 85 to the other input of the AND gate 70 and to the input of a delay element 86 whose output is connected to the input position II of the switch 80. The output of the OR gate 73 is connected via a line 87 to the other input of the AND gate 66 and to the input of a delay element 88 whose output is connected to the input position II of the switch 81. The output of the OR gate 74 is connected via a line 89 to the other input of the AND gate 67 and to the input of a delay line 90 whose output is connected to the input position II of the switch 82. The OR gate 75 has its output connected to one of the inputs of an adder 91 whose other input is connected to the line 47 via a line 92. The output from the adder 91 is multiplied by the quantity ½ in a multiplier 93. The output of the multiplier 93 is connected to the input of a delay element 94 which has its output connected via a line 95 to the input position II of the switch 46. The output of the multiplier 93 is also connected to one of the inputs of an AND gate 96 whose other input receives a transfer signal via a line 97. The output of the AND gate 96 is connected to the (−) input of a subtractor 98 which has its output connected to the line 31 (FIG. 1). The (+) input of the subtractor 98 is connected to the output of a register 99 whose input is connected to the line 28 via a line not shown. The output of the OR gate 76 is connected to one of the input of an adder 100 which has its other input connected to the line 51 via a line 101. The output from the adder 100 is multiplied by the quantity ½ in a multiplier 102. The output of the multiplier 102 is connected to the input of a delay element 103 which has its output connected via a line 104 to the input position II of the switch 50. The output of the multiplier 102 is also connected to one of the inputs of an AND gate 105 whose other input receives the transfer signal via the line 97. The output of the AND gate 105 is connected to the (−) input of a subtractor 106 whose output is connected to the line 32 (FIG. 1). The (+) input of the subtractor 106 is connected to the output of a register 107 whose input is connected to the line 29 by means of a line not shown. Delay elements 84, 86, 88, 90, 94 and 103 introduce a delay equal to the time interval between two successive iterations.

The operation of the device shown in FIG. 3 will now be described. During the initialization step of the dichotomy, the switches 46, 50, 78, 80, 81 and 82 are all set to the input position I. The component $z_{i,n}$ available on the line 28 is applied to the multiplier 48 which supplies the quantity $z_{i,n}^2$. Simultaneously, the component $z_{q,n}$ available on the line 29 is applied to the multiplier 52 which provides the quantity $z_{q,n}^2$. The quantity $\Delta_o$ as defined by relation (18) is obtained at the output of the subtractor 53. The components $z_{i,n}$ and $z_{q,n}$ are respectively stored in the registers 99 and 107.

If the quantity $\Delta_o$ is negative, the output of the device 54 goes low and inhibits the AND gates 56, 57, 58, 59, 66 and 67, and the output of the inverter 60 goes high, thereby activating the AND gates 61, 62, 63, 64, 69 and 70.

The component $z_{i,n}$ is multiplied by K in the multiplier 77 and the quantity K $z_{i,n}$, which, according to relation (19), is equal to $V_{sup}(1)$, is applied to the input of the adder 91 through the gates 61, 71, 69 and 75.

The component $z_{i,n}$ is added to $V_{sup}(1)$ in the adder 91 and the coordinate $V_1$ is obtained at the output of the multiplier 93 in accordance with relations (22). The coordinate $V_1$ is then stored in the delay element 94. Similarly, the coordinate $W_1$ is obtained at the output of the multiplier 102 in accordance with relations (22), and is stored in the delay element 103. The coordinates $V_{inf}(1)$, $W_{inf}(1)$, $V_{sup}(1)$ and $W_{sup}(1)$ as defined by relations (19) are stored in the delay elements 88, 90, 84 and 86, respectively.

It will be seen that, if the quantity $\Delta_o$ were positive, the coordinates $V_1$ and $W_1$ as defined by relations (21) would be obtained at the output of the multipliers 93 and 102. Upon completion of the initialization step, the switches 46, 50, 78, 80, 81 and 82 are all set to the input position II and the successive iterations are performed. The iteration that will result in the values $V_n$ and $W_n$ becoming $V_{n+1}$ and $W_{n+1}$, respectively, will now be described. At the beginning of this iteration, the values $V_n$, $W_n$, $V_{inf}(n)$, $W_{inf}(n)$, $V_{sup}(n)$ and $W_{sup}(n)$ are respectively available at the output of the delay elements 94, 103, 88, 90, 84 and 86.

The coordinate $V_n$ is fed to the multiplier 48 through the line 95 and the switch 46 (set to position II), and the coordinate $W_n$ is applied to the multiplier 52 through the line 104 and the switch 50 (set to position II). The value of the quantity $\Delta_n$ as defined by relation (23) is obtained at the output of the subtractor 53.

If the quantity $\Delta_n$ is negative, the coordinate $V_{sup}(n)$, which is available at the output of the delay element 84 and, according to relations (25), is equal to $V_{sup}(n+1)$, is applied to the input of the adder 91 through the switch 78 (set to position II) and the gates 61, 71, 69 and 75. The coordinate $V_{sup}(n+1)$ is added to the coordinate $V_N$, which is available at the output of the delay element 94 and is applied to the adder 91 through the line 95, the switch 46 (set to position II) and the line 92. The coordinate $V_{n+1}$ is obtained at the output of the multiplier 93 in accordance with relations (27). Similarly, the coordinate $W_{n+1}$ is obtained at the output of the multiplier 102 in accordance with relations (27). It will be seen that, if the quantity $\Delta_n$ were positive, the coordinates $V_{n+1}$ and $W_{n+1}$ as defined by relations (26)

would be obtained at the output of the multipliers 93 and 102.

After N iterations, the coordinates $V_N$ and $W_N$ are available at the output of the multipliers 93 and 102, and a transfer signal is applied via the line 97 to activate the AND gates 96 and 105. The coordinate $V_N$ thus available at the output of the AND gate 96 is subtracted from the value of $z_{i,n}$ transferred from the register 99 to the subtractor 98, and the component $e_{i,n}$ of the error signal is obtained on the line 31. Similarly, the component $e_{q,n}$ of the error signal is obtained on the output line 31 of the subtractor 106.

The components $e_{i,n}$ and $e_{q,n}$ of the error signal are applied to the equalizer 14 via the lines 31 and 32, the switches 24 and 25 (both of which are set to position II) and the lines 26 and 27.

The equalizer 14 is an adaptive complex equalizer of the type described in detail in French Pat. No. 73-26404 filed by the present applicant July 12, 1973 (publication No. 2,237,379), and illustrated in FIG. 5.

The equalized signal $z_n$ supplied by the equalizer at the signaling instant nT is conventionally expressed as $$z_n = \sum_{m=1}^{M} y_{n-m} C_m \tag{28}$$

where
M is the number of taps of the equalizer,
$C_m$ represents the tap gain values, and
$y_{n-m}$ is the demodulated signal present at the $m^{th}$ tap.

In the particular case of a DSB-QC receiver, $z_n$, $y_{n-m}$ and $C_m$ are complex quantities:

$z_n = z_{i,n} + j z_{q,n}$
$y_{n-m} = y_{i,n-m} + j y_{q,n-m}$
$C_m = c_m + j d_m$ and relation (28) can be written $$z_{i,n} = \sum_{m=1}^{M} y_{i,n-m} c_m - \sum_{m=1}^{M} y_{q,n-m} d_m \tag{29}$$

$$z_{q,n} = \sum_{m=1}^{M} y_{i,n-m} d_m + \sum_{m=1}^{M} y_{q,n-m} c_m \tag{30}$$

Figure 5:
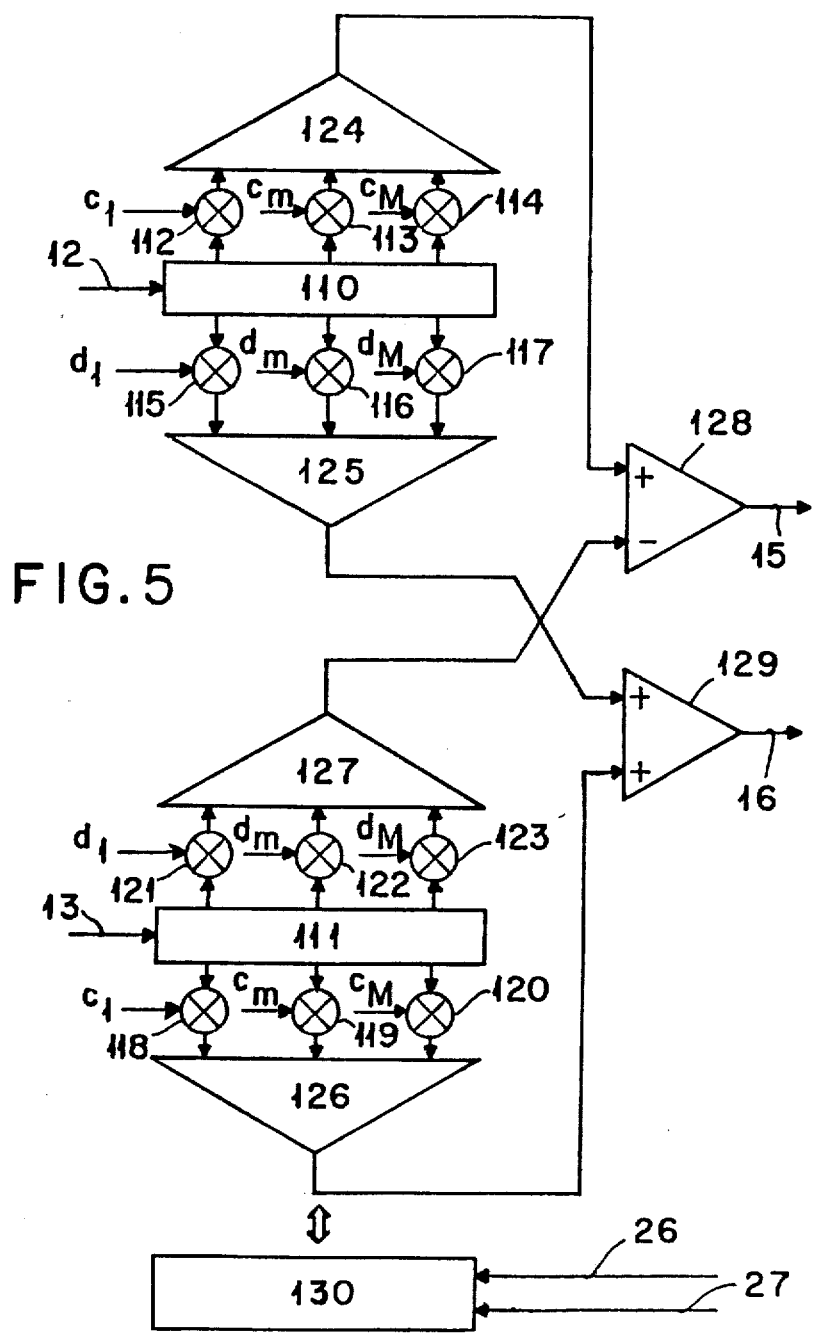
FIG. 5 is a schematic illustration of the adaptive complex equalizer 14 of FIG. 1.

The equalizer 14 shown in FIG. 5 uses relations (29) and (30) and includes two M-tap delay lines 110 and 111 in which the in-phase and quadrature components of the received demodulated signal are respectively stored. The delay between two adjacent taps is equal to the signaling period T. The taps of the delay line 110 are respectively connected to a first input of M multipliers 112, ..., 113, ..., 114 and to a first input of M multipliers 115, ..., 116, ..., 117. The second inputs of the multipliers 112, ..., 113, ..., 114 receive the values $c_1$, ..., $c_m$, ..., $c_M$, respectively, while the second inputs of the multipliers 115, ... 116, ..., 117 receive the values $d_1$, ..., $d_m$, ..., $d_M$, respectively. The taps of the delay line 111 are respectively connected to a first input of M multipliers 118, ..., 119, ..., 120, and to a first input of M multipliers 121, ..., 122, ..., 123. The second inputs of the multipliers 118, ..., 119, ..., 120 receive the values $c_1$, ..., $c_m$, ..., $c_M$ while the second inputs of the multipliers 121, ..., 122, ..., 123 receive the values $d_1$, ..., $d_m$, ..., $d_M$, respectively. The outputs from the multipliers 112, ..., 114 are summed in a summing device 124. The outputs from the multipliers 115, ..., 117 are summed in a summing device 125. The outputs from the multipliers 118, ..., 120 and 121, ..., 123 are respectively summed in summing devices 126 and 127. The output from the summing device 127 is subtracted from the output from the summing device 124 in a subtractor 128 which has its output connected to the line 15. The outputs from the summing devices 125 and 126 are added up in an adder 129 whose output is connected to the line 16. It will be seen that the components $z_{i,n}$ and $z_{q,n}$ will be respectively obtained on the lines 15 and 16 in accordance with relations (29) and (30). The tap gains of the equalizer are adjusted by means of a device 130 which receives the components of the error signal via the lines 26 and 27 and will be briefly described later with reference to FIG. 6.

The tap gains of the equalizer are adjusted in accordance with the method defined by relation (9'), which is repeated below for convenience:

$$C^{n+1} = C^n - \mu y_n^* e_n \tag{9'}$$

where
$C^{n+1}$ is the vector of the tap gain values $C_0, \ldots, C_m, \ldots, C_M$ at the $(n+1)^{th}$ iteration,
$C^n$ is the vector of the values $C_0, \ldots, C_M$ at the $n^{th}$ iteration,
$e_n$ is the error signal whose components are $e_{i,n}$ and $e_{q,n}$, and
$Y_n$ is the vector of the signal stored in the equalizer at the signaling instant nT, i.e. the vector of the signals $y_n, y_{n-1}, \ldots, y_{n-m}, \ldots, Y_M$.

The tap gains $C_m$ are complex quantities:

$$C_m = c_m + j d_m \tag{31}$$

The error signal $e_n$ can be written as $$e_n = e_{i,n} + j e_{q,n} \tag{32}$$

The signal $Y_n$ is a complex signal:

$$y_n = y_{i,n} + j y_{q,n} \tag{33}$$

Using relations (31), (32) and (33), we can obtain from relation (9'):

$$c_m^{n+1} = c_m^n - \mu(e_{i,n} y_{i,n-m} + e_{q,n} y_{q,n-m}) \tag{34}$$

$$d_m^{n+1} = d_m^n - \mu(e_{q,n} y_{i,n-m} - e_{i,n} y_{q,n-m}) \tag{35}$$

for n = 1, 2, ..., M.

The tap gain adjustment device 130 uses relations (34) and (35). For simplicity, only those circuits which are involved in the adjustment of tap gains $c_m$ and $d_m$ have been shown in FIG. 6.

The component $e_{i,n}$ supplied by the error signal generator 30 is applied via the line 26 to a first input of each of two multipliers 131 and 132. The second input of the multiplier 131 receives the component $y_{i,n-m}$ from the $n^{th}$ tap of the delay line 110. The product $e_{i,n} y_{i,n-m}$ is obtained at the output of the multiplier 131. The component $e_{q,n}$ supplied by the generator 30 is applied via the line 27 to a first input of each of two multipliers 133 and 134. The second input of the multiplier 134 receives the component $y_{q,n-m}$ from the $m^{th}$ tap of the delay line 111. The multiplier 134 supplies the product $e_{q,n} y_{q,n-m}$ which is added to the product $e_{i,n} y_{i,n-m}$ provided by the multiplier 131 in an adder 135. The output from the adder 135 is multiplied by the quantity $\mu$ in a multiplier 136 which supplies the control signal $$\mu(e_{i,n}y_{i,n-m} + e_{q,n}y_{q,n-m})$$

This control signal is subtracted from the value $c_m^n$, stored in an accumulator 137, of the tap gain $c_m$. The accumulator 137 contains at this time the new value, of $c_m$, $c_m^{n+1}$, which is fed to the multipliers 113 and 119 via the line 138.

The second input of the multiplier 133 receives the component $y_{i,n-m}$ while the second input of the multiplier 132 receives the component $y_{q,n-m}$. The output from the multiplier 132 is subtracted from the output from the multiplier 133 in a subtractor 139 whose output is multiplied by the quantity $\mu$ in a multiplier 140, which supplies the control signal $$\mu(e_{q,n}y_{i,n-m} - e_{i,n}y_{q,n-m})$$

The latter signal is subtracted from the value $d_m^n$, stored in an accumulator 141, of the tap gain $d_m$. The accumulator 141 contains at this time the new value, $d_m^{n+1}$, of $d_m$ and this new value is applied via the line 142 to the multipliers 116 and 122.

So far, the method of the present invention has been described in relation to the instance in which the tap gains of the equalizer are adjusted so as to minimize the dispersion of order 1, $D^{(1)}$.

According to relation (4), the dispersion of order 2 is written:

$$D^{(2)} = E(|z_n|^2 - R)^2 \qquad (36)$$

The error signal $e_n$ is expressed as $$e_n = z_n(|z_n|^2 - R) \qquad (37)$$

As before, the method of adjusting the tap gains of the equalizer includes two main steps, which consist of:
determining the error signal $e_n$, and
adjusting the tap gains in accordance with relation (9').

Only the step of determining the error signal differs from that discussed earlier; however, those skilled in the art should have no difficulty in applying relation (37) in view of the foregoing description. The error signal defined by relation (37) is easier to determine than the one defined by relation (14) but does not allow the tap gains to be adjusted as quickly. The minimization of the dispersion of order 3 leads to the determination of a more complex error signal. It will be understood by those skilled in the art that, in practice, the order of the dispersion will be dictated by a compromise between the speed at which the it is desired to adjust the tap gains and the complexity of the error signal generator.

The value of R will now be discussed. Obviously, changing R to $\alpha R$, where $\alpha$ is a positive number, will result under steady-state conditions in changing C to $\alpha^p C$. Thus, the value of R solely controls the amplification provided by the equalizer. If the constellation being transmitted is known, one can readily determine which value of R will provide an ideal amplification. For example, in the particular case of the dispersion of order 1, it will be seen that, substituting $a_n$ for $z_n$ in relation (6), the following would be obtained:

$$R = (E|a_n|^2)/(E|a_n|) \qquad (65)$$

In the instance of the constellation defined by CCITT Recommendation V29, one obtains R = 3.95, while in that of the 16-state rectangular constellation, the value obtained is R = 3.34.

While in the invention has been particularly shown and described with reference to a preferred embodiment thereof, it will be understood by those skilled in the art that numerous changes in form and detail may be made therein without departing from the spirit and scope of the invention.

What is claimed is:

1. In a data receiver for a synchronous data transmission system wherein the data symbols are transmitted at the signaling rate 1/T, using a double sideband-quadrature carrier modulation technique, said receiver including an adaptive complex equalizer having several tap gains, a method of training said equalizer, characterized in that it includes the steps of:

applying the signal received from the transmission channel to said equalizer, with said equalizer providing an equalized signal $z_n$ at the signaling instant nT, where the value of n ranges from zero to infinity, in accordance with the following expression:

$$z_n = y_n'C$$

where $y_n$ is the vector of the signal stored in said equalizer at the signaling instant nT, ' denotes transposition of vector $y_n$, C is the vector of the tap gain values; and adjusting said tap gains so as to minimize the quantity $$D^{(p)} = E(|z_n|^p - R)^2$$

where E denotes the mathematical expectation which can be read as "the average value of,"
R is a positive real constant,
p is a positive integer, and
| | denotes the modulus.

2. A method according to claim 1, characterized in that said step of adjusting said tap gains includes the steps of:

generating an error signal derived from the equalized signal, with the error signal $e_n$ generated at the signaling instant nT, being defined as $$e_n = z_n|z_n|^{p-2}(|z_n|^p - R)$$

and adjusting the tap gains of said equalizer in such a way that the average value of the product $$y^*_n e_n$$

where * denotes the conjugate complex quantity, will tend to approach zero.

3. In a data receiver for a synchronous data transmission system wherein the data symbols are transmitted at the signaling rate 1/T, using a double sideband-quadrature carrier modulation technique, said receiver including an adaptive complex equalizer having several tap gains, a method of training said equalizer, characterized in that it includes the steps of:

applying the signal received from the transmission channel to said equalizer, with said equalizer providing an equalized signal $z_n$ at the signaling instant nT, where the value of n ranges from zero to infinity, in accordance with the following expression:

$$z_n = y_n'C$$

where yn is the vector of the signal stored in said equalizer at the signaling instant nT,
' denotes transposition of vector yn,
C is the vector of the tap gain values; and adjusting said tap gains so as to minimize the quantity $$D^{(1)} = E(|z_n| - R)^2$$

where E denotes the mathematical expectation which can be read as "the average value of,"
R is a positive real constant, and
| | denotes the modulus.

4. A method according to claim 3, characterized in that said step of adjusting said tap gains includes the steps of:
generating an error signal derived from the equalized signal, with the error signal $e_n$ generated at the signaling instant nT, being defined as:

$$e_n = z_n - R \exp j\omega_n$$

where $\omega_n$ is the phase of the equalized signal $z_n$; and adjusting the tap gains of said equalizer in such a way that the average value of the product $$y_n^* e_n$$

where * denotes the conjugate complex quantity, will tend to approach zero.

5. In a data receiver for a synchronous data transmission system wherein the data symbols are transmitted at the signaling rate 1/T, using a double sideband-quadrature carrier modulation technique, said receiver including an adaptive complex equalizer having several tap gains, a method of training said equalizer, characterized in that it includes the steps of:
applying the signal received from the transmission channel to said equalizer, with said equalizer providing an equalized signal $z_n$ at the signaling instant nT, where the value of n ranges from zero to infinity, in accordance with the following expression:

$$z_n = y_n' C$$

where $y_n$ is the vector of the signal stored in said equalizer at the signaling instant nT,
' denotes transposition of vector $y_n$,
C is the vector of the tap gain values;
determining the distance between a first point representative of said equalized signal in a rectangular coordinates system and a second point having the same phase as said first point and located on a circle of radius R, said distance being designated $e_n$ where said first point corresponds to the equalized signal at the signaling instant nT, and
adjusting the tap gains of said equalizer in such a way that the average value of the product $$y_n^* e_n$$

where * denotes the conjugate complex quantity, will tend to approach zero.

6. A method according to any one of the preceding claims, characterized in that the received signal is demodulated before it is applied to the equalizer.

7. A method according to any one of claims 2, 4 and 5, characterized in that the tap gains of the equalizer are adjusted in accordance with the relation $$C^{n+1} = C^n - \mu y_n^* e_n$$

where $C^n$ and $C^{n+1}$ are the vectors of the tap gain values at the $n^{th}$ and $(n+1)^{th}$ iterations and
$\mu$ is a positive constant.

8. In a data receiver for a synchronous data transmission system wherein the data symbols are transmitted at the signaling rate 1/T, using a double sideband-quadrature carrier modulation technique, said receiver including an adaptive complex equalizer having several tap gains, a method of training said equalizer, characterized in that it includes:
means for applying the signal received from the transmission channel to said equalizer, with said equalizer providing an equalized signal $z_n$ at the signaling instant nT, where the value of n ranges from zero to infinity, in accordance with the following expression:

$$z_n = y_n' C$$

where $y_n$ is the vector of the signal stored in said equalizer at the signaling instant nT, ' denotes transposition of vector $y_n$, C is the vector of the tap gain values;
means for generating an error signal in response to said equalized signal, with the error signal $e_n$ generated at the signaling instant nT being defined as:

$$e_n = z_n |z_n|^{p-2}(|z_n| - R)$$

means for deriving from said error signal control signals for adjusting the tap gains of the equalizer in such a way that the average value of the product $$y_n^* e_n$$

where * denotes the conjugate complex quantity, will tend to approach zero.

9. A device according to claim 8, characterized in that p=1 and in that said means for generating said error signal include:
means for determining the phase of the equalized signal, and
means for generating said error signal by deriving same from both the equalized signal and the phase thereof, with the error signal $e_n$ at the signaling instant nT being defined as $$e_n = z_n - R \exp j\omega_n$$

where $\omega_n$ is the phase of the equalized signal $z_n$.

10. A device according to claim 8, characterized in that p=2 and in that said error signal $e_n$ is defined as $$e_n = z_n(|z_n|^2 - R).$$

11. In a data receiver for a synchronous data transmission system wherein the data symbols are transmitted at the signaling rate 1/T, using a double sideband-quadrature carrier modulation technique, said receiver including an adaptive complex equalizer that has several tap gains and supplies the in-phase and quadrature components of the equalized signal, with said equalized signal $z_n$ at signaling instant nT, where the value of n ranges from zero to infinity, being defined as:

$$z_n = y_n' C$$

where $y_n$ is the vector of the signals stored in said equalizer at the signaling instant nT, ' denotes transposition of vector $y_n$, C is the vector of the tap gain values;

a device for training said equalizer, characterized in that it includes:

means for generating the in-phase and quadrature components of an error signal from the in-phase and quadrature components of the equalized signal, with the error signal $e_n$ at the signaling instant nT being defined as $$e_n = z_n - R \exp j\omega_n$$

where $\omega_n$ is the phase of the equalized signal $z_n$, and R is a positive constant; and means for deriving from said in-phase and quadrature components of the error signal control signals for adjusting the tap gains of the equalizer so that the average value of the product $$y_n^* e_n$$

where * denotes the conjugate complex quantity, will tend to approach zero.

12. A device according to claim 11, characterized in that said means for generating the in-phase and quadrature components of said error signal include:

means for determining the phase $\omega_n$ of the equalized signal from the in-phase and quadrature components thereof, means responsive to the value of the phase $\omega_n$ to provide the quantities $R \cos \omega_n$ and $R \sin \omega_n$, means for subtracting said quantity $R \cos \omega_n$ from the in-phase component of the equalized signal, thereby providing the in-phase component of said error signal, and means for subtracting said quantity $R \sin \omega_n$ from the quadrature component of the equalized signal, thereby providing the quadrature component of said error signal.

13. A device according to claim 11, characterized in that said means for generating the in-phase and quadrature components of the error signal include:

means for determining from the in-phase and quadrature components of the equalized signal $z_n$ first and second coordinates of a point which, in a rectangular coordinates system, has the same phase as said equalized signal $z_n$ and is located on a circle of radius R, means for subtracting said first coordinate from said in-phase component of the equalized signal, thereby providing the in-phase component of said error signal $e_n$, and means for subtracting said second coordinate from said quadrature component of the equalized signal, thereby providing the quadrature component of said error signal $e_n$.

14. A device according to any one of claims 8 through 13, characterized in that said means for adjusting the tap gains of the equalizer include means for adjusting said tap gains in accordance with the relation $$C^{n+1} = C^n - \mu y_n^* e_n$$

where $C^n$ and $C^{n+1}$ are the vectors of the tap gain values at the $n^{th}$ and $(n+1)^{th}$ iterations, respectively, and $\mu$ is a positive constant.

* * * * *